US012696351B2

(12) United States Patent

Liu

(10) Patent No.: US 12,696,351 B2
(45) Date of Patent: Jul. 28, 2026

(54) MULTICAST SERVICE RECEIVING METHOD, MULTICAST SERVICE CONFIGURATION METHOD, TERMINAL, AND NETWORK SIDE DEVICE

(71) Applicant: VIVO MOBILE COMMUNICATION CO., LTD., Dongguan (CN)

(72) Inventor: Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 439 days.

(21) Appl. No.: 18/241,867

(22) Filed: Sep. 2, 2023

(65) Prior Publication Data

US 2023/0422346 A1 Dec. 28, 2023

Related U.S. Application Data

(63) Continuation of application No. PCT/CN2022/078553, filed on Mar. 1, 2022.

(30) Foreign Application Priority Data

Mar. 5, 2021 (CN) .......................... 202110247370.5

(51) Int. Cl.
H04W 4/00 (2018.01)
H04W 76/19 (2018.01)
H04W 76/40 (2018.01)

(52) U.S. Cl.
CPC ........... *H04W 76/40* (2018.02); *H04W 76/19* (2018.02)

(58) Field of Classification Search
CPC ............................. H04W 76/40; H04W 76/19
See application file for complete search history.

(56) References Cited

U.S. PATENT DOCUMENTS

| | | | | |
|---|---|---|---|---|
| 2011/0305184 A1* | 12/2011 | Hsu | ................... | H04W 36/0007 |
| | | | | 370/312 |
| 2013/0122918 A1* | 5/2013 | Boley | ................... | H04W 76/27 |
| | | | | 455/450 |

(Continued)

FOREIGN PATENT DOCUMENTS

| | | |
|---|---|---|
| CN | 109982266 A | 7/2019 |
| CN | 111866975 A | 10/2020 |

(Continued)

OTHER PUBLICATIONS

International Searching Authority, English Translation of the Written Opinion of the International Searching Authority, Mar. 1, 2022, WIPO, pp. 1-4. (Year: 2022).*

(Continued)

*Primary Examiner* — Elisabeth Benoit Magloire
(74) *Attorney, Agent, or Firm* — IPX PLLC

(57) ABSTRACT

A multicast service receiving method, a multicast service configuration method, a terminal, and a network side device, are provided. The multicast service receiving method includes: receiving reconfiguration information of a multicast service, where the reconfiguration information includes at least one of the following: first indication information used to indicate whether a Packet Data Convergence Protocol (PDCP) Serial Number (SN) of a multicast service or a target Multicast Broadcast Multicast Service (MBMS) Radio Bearer (MRB) of the multicast service before reconfiguration is synchronized with that after reconfiguration, second indication information used to indicate a PDCP layer operation performed by the terminal, third indication information used to indicate a Radio Link Control (RLC) layer operation performed by the terminal, RLC layer reconfiguration information, and PDCP layer reconfiguration infor- (Continued)

Receive reconfiguration information of a multicast service transmitted by a network side device — 31

Perform corresponding layer 2 processing according to the reconfiguration information — 32 mation; and performing corresponding layer 2 processing according to the reconfiguration information.

20 Claims, 7 Drawing Sheets

(56)                References Cited

U.S. PATENT DOCUMENTS

| | | | | |
|---|---|---|---|---|
| 2014/0112236 A1* | 4/2014 | Jung | ................... | H04W 36/302 |
| | | | | 370/312 |
| 2015/0146617 A1* | 5/2015 | Park | ..................... | H04W 28/06 |
| | | | | 370/328 |
| 2018/0083688 A1* | 3/2018 | Agiwal | ................ | H04W 80/02 |
| 2019/0349822 A1* | 11/2019 | Kim | ..................... | H04W 36/08 |
| 2020/0008266 A1* | 1/2020 | Pan | ...................... | H04L 1/1642 |
| 2020/0084659 A1* | 3/2020 | Pan | ...................... | H04W 28/06 |
| 2021/0126745 A1* | 4/2021 | Kadiri | ................... | H04L 1/1832 |
| 2022/0303729 A1* | 9/2022 | Xu | ........................ | H04W 4/06 |
| 2022/0303730 A1* | 9/2022 | Xu | ........................ | H04L 1/1642 |
| 2022/0322289 A1* | 10/2022 | Xu | ........................ | H04L 1/1887 |
| 2023/0027089 A1* | 1/2023 | Pelletier | ................ | H04L 1/1816 |
| 2023/0029998 A1* | 2/2023 | Narayanan Thangaraj | ................ | |
| | | | | H04W 72/30 |
| 2023/0354106 A1* | 11/2023 | Godin | ................... | H04W 72/30 |

FOREIGN PATENT DOCUMENTS

| | | |
|---|---|---|
| CN | 111901765 A | 11/2020 |
| CN | 111901766 A | 11/2020 |

OTHER PUBLICATIONS

International Search Report issued in corresponding International Application No. PCT/CN2022/078553, mailed May 25, 2022, 4 pages.
Vivo, "Dynamic PTM PTP Switch for RRC Connected UE", 3GPP TSG-RAN WG2 Meeting #113-e E-Meeting, R2-2100833, Jan. 2021, 8 pages.
Samsung, "General Considerations on Mobility with Service Continuity", 3GPP TSG-RAN WG2 Meeting #112-e E-Meeting, R2-2009461, Nov. 2020, 5 pages.
Vivo, "Dynamic PTM PTP Switch for RRC Connected UE", 3GPP TSG-RAN WG2 Meeting #112-e E-Meeting, R2-2020216, Nov. 2020, 8 pages.

* cited by examiner

Receive reconfiguration information of a multicast service transmitted by a network side device — 31

Perform corresponding layer 2 processing according to the reconfiguration information — 32

Send reconfiguration information of a multicast service to a terminal — 41

MULTICAST SERVICE RECEIVING METHOD, MULTICAST SERVICE CONFIGURATION METHOD, TERMINAL, AND NETWORK SIDE DEVICE

CROSS-REFERENCE TO RELATED APPLICATIONS

This application is a continuation of International Application No. PCT/CN2022/078553, filed on Mar. 1, 2022, which claims priority to Chinese Patent Application No. 202110247370.5, filed Mar. 5, 2021. The entire contents of each of the above-identified applications are expressly incorporated herein by reference.

TECHNICAL FIELD

The present application is directed to the technical field of wireless communication, and specifically, relates to a multicast service receiving method, a multicast service configuration method, a terminal, and a network side device.

BACKGROUND

In the broadcast and multicast transmission of Long Term Evolution (LTE), Multicast Broadcast Multicast Service (MBMS) transmission in Multicast Broadcast Single Frequency Network (MBSFN) mode and multicast service transmission in Single Cell Point To Multipoint (SC-PTM) mode are supported. In the MBSFN mode, cells in a same MBSFN area send a same broadcast service synchronously, which is convenient for User Equipment (UE, also referred to as terminal) to receive. MBMS service control information (control channel parameters, traffic channel parameters, scheduling information, etc.) and data information are sent in broadcast mode, so that both UEs in an idle state and UEs in a connected state can receive MBMS services. The biggest difference of SC-PTM from MBSFN is that it only schedules transmission in a single cell, and service scheduling is performed by the Group Radio Network Temporary Identity (G-RNTI). In a broadcast message, the control channel parameters, service identification, period information, and the like are broadcast, and scheduling information is notified by a Physical Downlink Control CHannel (PDCCH) scrambled by G-RNTI. The data part is sent in multicast mode. It is equivalent to that interested UE listens to the G-RNTI to obtain data scheduling and then receives it.

For a multicast service, the network side can configure two paths for UE to transmit at the same time, one is a Point To Point (PTP) path, and the other is a Point To Multipoint (PTM) path. The PTM path refers to the use of public Radio Network Temporary Identity (RNTI), such as G-RNTI for PDCCH scrambling, all users in the group jointly monitor the scheduling of G-RNTI and receive subsequent scheduling data, and a transmission can be jointly received by multiple UEs. However, the PTP path refers to the use of UE-specific Cell Radio Network Temporary Identifier (C-RNTI) for PDCCH scrambling, only this UE can monitor the scheduling of C-RNTI and receive subsequent scheduling data, and a transmission can only be received by one UE at a time.

PTM refers to transmission to multiple UEs at the same time, and the transmission efficiency is high, but it needs to comprehensively consider the coverage of all UEs. Therefore, the selection of transmission parameters needs to be applicable to all UEs as much as possible, such as using omnidirectional antennas and considering poor user link quality. PTM may not be effective for UEs with extremely poor link quality. However, PTP is a dedicated transmission for one UE. Transmission parameters can be adjusted by considering link conditions of this user, such as using directional or shaped antennas, and setting appropriate transmission parameters according to the link of the current UE. Therefore, the transmission effect for a single UE is good, but if there are multiple users, multiple transmission resources are required, which is less resource efficient.

In the existing technology, the multicast transmission mode of LTE does not support PTM and PTP transmission modes, which is equivalent to only supporting the PTM mode. Besides, the LTE MBSFN mode is that all service transmissions in the entire synchronization area are strictly synchronized, while the SC-PTM mode is independent scheduling of a single cell, and does not consider continuous reception optimization across cells.

For multicast transmission designed in NR, it has been first determined not to use MBSFN, because the scheduling efficiency is relatively low. Therefore, strict synchronization between multiple cells cannot be guaranteed. If only single-cell scheduling is considered in accordance with the SC-PTM mode, when the UE is switched across cells, it causes discontinuous reception of the multicast service, affecting user experience. In addition, the conversion of PTP and PTM multiple transmission path combinations is a unique requirement of NR, and the problem of continuous reception during conversion needs to be solved.

SUMMARY

The embodiments of the present application is to provide a multicast service receiving method, a multicast service configuration method, a terminal and a network side device.

According to a first aspect, a multicast service receiving method is provided, executed by a terminal, including:

receiving reconfiguration information of a multicast service sent by a network side device, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information; and performing corresponding layer 2 processing according to the reconfiguration information.

According to a second aspect, a multicast service configuration method is provided, executed by a network side device, including:

sending reconfiguration information of a multicast service to a terminal, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information.

According to a third aspect, a multicast service receiving apparatus is provided, including:

a receiving module, configured to receive reconfiguration information of a multicast service sent by a network side device, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information; and an executing module, configured to perform corresponding layer 2 processing according to the reconfiguration information.

According to a fourth aspect, a multicast service configuration apparatus is provided, including.

a sending module, configured to send reconfiguration information of a multicast service to a terminal, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information.

According to a fifth aspect, a terminal is provided. The terminal includes a processor, a memory, and a program or an instruction stored in the memory and capable of running on the processor, and when the program or the instruction is executed by the processor, the steps of the method according to the first aspect are implemented.

In a sixth aspect, a network side device is provided, where the network side device includes a processor, a memory, and a program or an instruction stored in the memory and executable on the processor, and when the program or the instruction is executed by the processor, steps of the method according to the second aspect are implemented.

In a seventh aspect, a readable storage medium is provided, where the readable storage medium stores a program or an instruction, and when the program or the instruction is executed by a processor, steps of the method according to the first aspect or the second aspect are implemented.

According to an eighth aspect, a chip is provided. The chip includes a processor and a communication interface, the communication interface is coupled to the processor, and the processor is configured to run a program or instructions of a network side device to implement the method in the first aspect or the method in the second aspect.

According to a ninth aspect, a computer program product is provided. The computer program product is stored in a non-volatile storage medium, and the computer program product is executed by at least one processor, to implement the method according to the first aspect or the method according to the second aspect.

According to a tenth aspect, a communication device is provided, where the communication device is configured to perform the method according to the second aspect.

In the embodiments of the application, under the instruction of the network side, the UE can maintain continuous reception of the multicast service during cell switching or path switching of the multicast service, which not only guarantees the flexibility of network scheduling but also guarantees UE user experience, further ensuring system efficiency while improving the QoS and experience of UE receiving the MBS service.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in the description and the claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that the technology described in the embodiments of this application is not limited to a Long Time Evolution (LTE)/LTE-Advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communication system.

Figure 1:
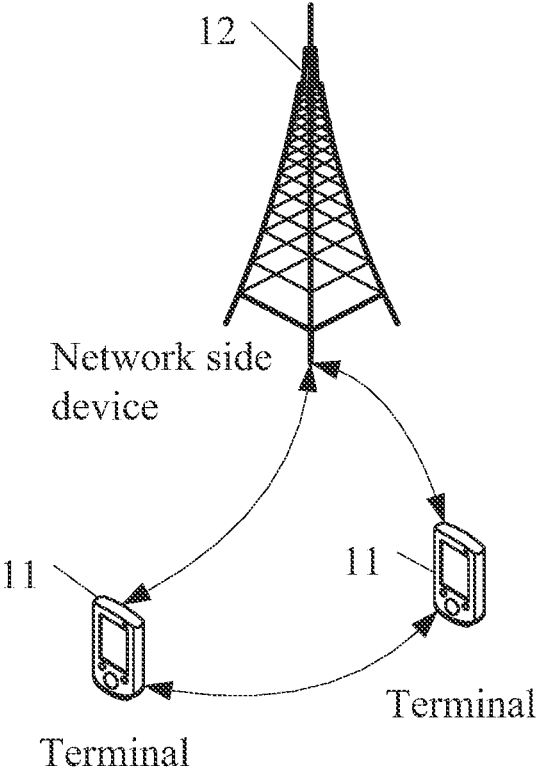
FIG. 1 is a block diagram of a wireless communications system to which an embodiment of this application is applicable.

FIG. 1 is a block diagram of a wireless communications system to which an embodiment of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or Vehicle User Equipment (VUE), or Pedestrian User Equipment (PUE). The wearable device includes a band, a headset, eyeglasses, or the like. It should be noted that a specific type of the terminal 11 is not limited in this embodiment of this application. The network side device 12 may be a base station or a core network device. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a Wireless Local Area Network (WLAN) access point, a WiFi node, a Transmission Reception Point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited.

The paging message receiving method, the multicast service receiving method, multicast service configuration method, the terminal and the network side device provided by the embodiments of the present application will be described in detail below through specific embodiments and application scenarios with reference to the accompanying drawings.

Figure 2:
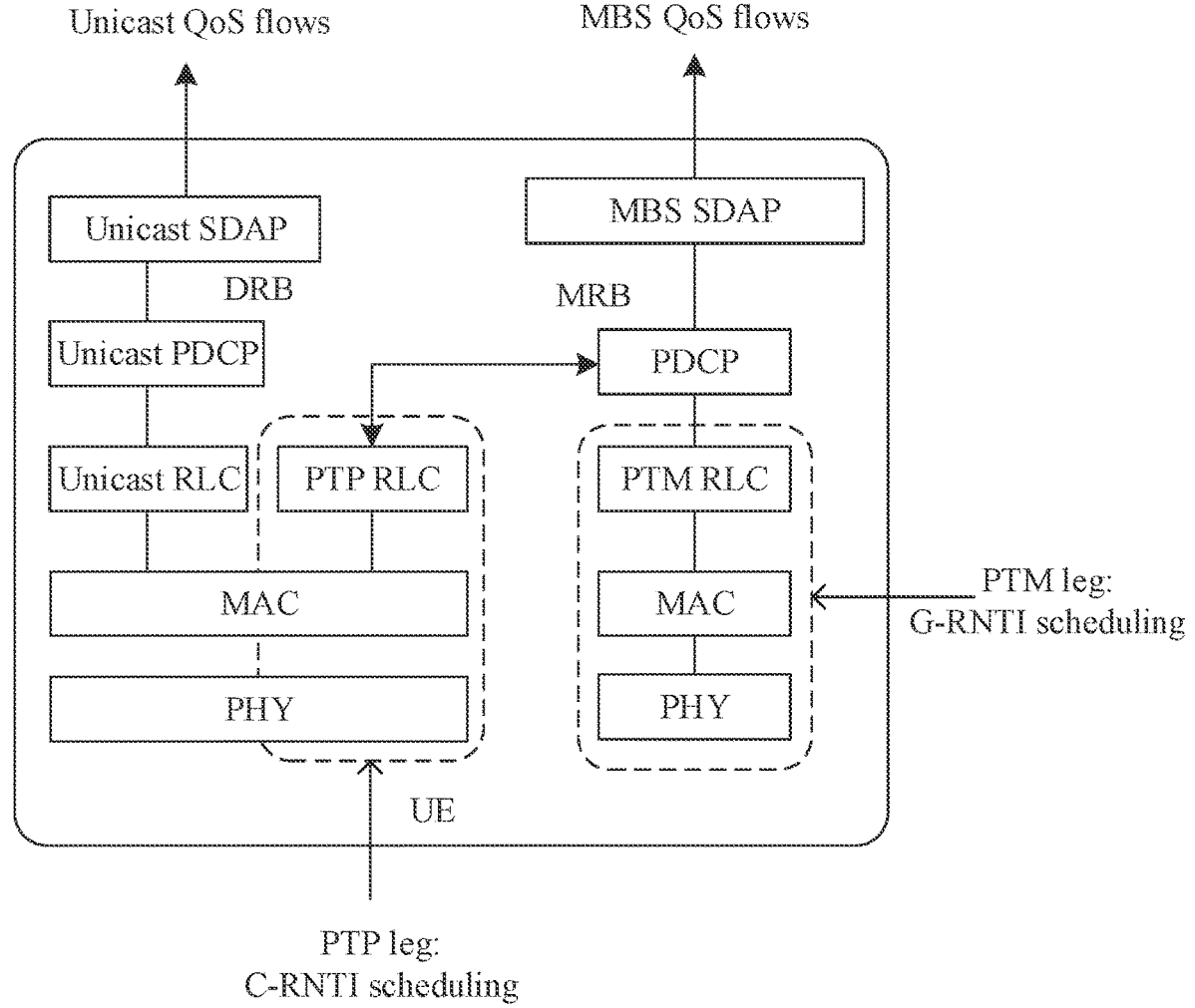
FIG. 2 is a schematic diagram of a protocol stack architecture of a terminal according to an embodiment of the present application.

FIG. 2 is a schematic diagram of a protocol stack architecture of a terminal according to the embodiment of the present application. In FIG. 2, only one unicast Data Radio Bearer (DRB) and one MBMS Radio Bearer (MRB) are drawn, which is an example and gives protocol stack correlation between the two. In practice, a terminal can have multiple unicast DRBs, or multiple MRBs corresponding to one Temporary Mobile Group Identity (TMGI) or G-RNTI, or even multiple TMGIs or G-RNTIs. Each TMGI or G-RNTI corresponds to one or more MRBs. The multiple MRBs can be all configured with PTP paths (legs), all of them can be configured with only PTM legs, or some of them can be configured with PTP legs and the rest can only be configured with PTM legs. It can be seen from FIG. 2 that for an MRB, its PTM leg and PTP leg have a common Packet Data Convergence Protocol (PDCP) entity, and therefore in the process of multicast service path switching or cell switching, the PDCP layer can be used to achieve continuous reception of multicast services.

Figures 3, 4:
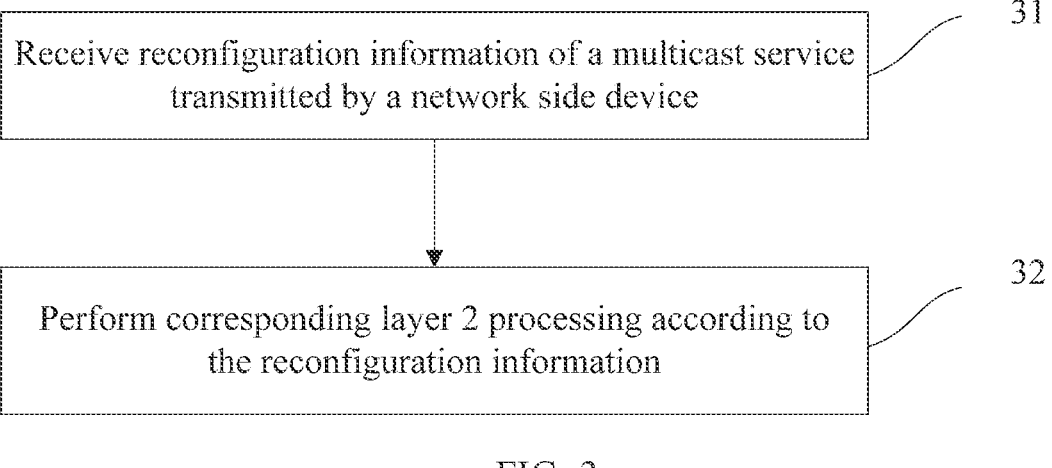
FIG. 3 is a flowchart of a multicast service receiving method according to an embodiment of the present application.
FIG. 4 is a flowchart of a multicast service configuration method according to an embodiment of the present application.

FIG. 3 is a flowchart of a multicast service receiving method according to an embodiment of the present application. The multicast service receiving method includes:

Step 31: Receive reconfiguration information of a multicast service sent by a network side device, where the reconfiguration information includes at least one of the following: first indication information used to indicate whether a PDCP Sequence Number (SN) of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, Radio Link Control (RLC) layer reconfiguration information, and PDCP layer reconfiguration information.

In this embodiment of the present application, each multicast service may be configured with at least one MRB, each MRB may be configured with one or two RLC entities, and the one or two RLC entities share one PDCP layer entity.

Step 32: Perform corresponding layer 2 processing according to the reconfiguration information.

In the embodiments of the application, under the instruction of the network side, the UE can maintain continuous reception of the multicast service during cell switching or path switching of the multicast service, which not only guarantees the flexibility of network scheduling but also guarantees UE user experience, further ensuring system efficiency while improving the Quality of Service (QoS) and experience of UE receiving the MBS service.

In the embodiment of the present application, the network side may send the reconfiguration information of the multicast service to the terminal during the cell switching process or before the path switching of the multicast service. The terminal performs corresponding layer 2 processing according to the reconfiguration information during the cell switching process or the path switching of the multicast service.

In application to the cell switching process, whether the PDCP SN before reconfiguration is synchronized with that after reconfiguration is equivalent to whether the PDCP SN in the source cell is synchronized with that in the target cell, that is, it corresponds to the source cell before reconfiguration and corresponds to the target cell after reconfiguration.

In the embodiments of this application, optionally, reconfiguration information sent by the network side includes at least one of the following during the process of cell switching: first indication information used to indicate whether a PDCP SN of a multicast service or a target MRB of the multicast service in a source cell is synchronized with that in a target cell, second indication information used to indicate a PDCP layer operation performed by the terminal, third indication information used to indicate a RLC layer operation performed by the terminal, RLC layer reconfiguration information, and PDCP layer reconfiguration information.

Since the terminal is switched from the source cell to the target cell during cell switching, if PDCP SNs allocated by the source cell and the target cell are synchronized for the MRB of the same multicast service, that is, the same PDCP SN is assigned to the same data packet (data content of the same PDCP SNs is exactly the same), the terminal only needs to sort the PDCP SNs according to data packets received by the source cell and the target cell, which can ensure continuous and lossless service reception.

In the embodiment of this application, the premise of synchronization between PDCP SNs of the source cell and the target cell is that the content and pipeline of the multicast service data sent by the core network to different base stations or cells are the same, that is, a Temporary Mobile Group Identifier (TMGI) service corresponds to an MBS Protocol Data Unit (PDU) session, the MBS PDU session can include different QoS flows, there is a level of Core Network (CN) tunnel SN number at the MBS PDU session level, and there can also be a level of CN SN number in each QoS flow granularity.

For different base stations or cells, in order to obtain a unified PDCP SN, the simplest way without additional overheads is to set PDCP SN=CN SN. To this end, one-to-one mapping is performed between a CN SN data flow and an MBS, that is, all data of an MBS PDU session is mapped to one MRB, and the PDCP SN of the MRB=CN SN of the PDU session layer, or one-to-one mapping is performed between a QoS flow and an MRB, and the PDCP SN of the MRB=CN SN of the QoS flow. Both mapping methods can ensure the synchronization between PDCP SNs of different cells.

When the maximum number of MRBs supported by an MBS PDU session is equal to the maximum number of QoS flows, one-to-one mapping between QoS flows and MRBs can be easily realized, so that for each MRB, PDCP SN=CN SN of the QoS flow layer, cross-cell PDCP SN synchronization is implemented for each MRB, and lossless reception can be performed.

When the maximum number of MRBs supported by an MBS PDU session is less than the maximum number of QoS flows, it means that there must be a many-to-one mapping between QoS flows and MRBs. Then, the network side can perform one-to-one mapping between a QoS flow that requires lossless reception and an MRB according to the algorithm, so as to realize PDCP SN cross-cell synchronization. Other QoS flows that do not require lossless reception can be many-to-one mapped to a same MRB, and PDCP SN synchronization is discarded; or when there are too many QoS flows that require lossless reception and not all of them can be supported, one-to-one mapping may be performed between high-priority QoS flows that require lossless reception and MRBs according to priorities of the QoS flows, and other low-priority QoS flows that require lossless reception and other QoS flows that do not require lossless reception maintain many-to-one mapping to MRBs, and PDCP SN synchronization is discarded.

Of course, when the maximum number of MRBs supported by an MBS PDU session is equal to the maximum number of QoS flows, the network side can also many-to-one map some QoS flows that do not require lossless reception to one MRB as required, to reduce the number of MRBs and complexity.

The switching of the multicast service between the PTP path and the PTM path does not involve the switching of the cell and is in the same cell, and only the path for transmitting the multicast service is switched. Therefore, the reconfiguration information does not include: first indication information indicating whether the PDCP SN of the multicast service or the target MRB of the multicast service before reconfiguration is synchronized with that after reconfiguration. That is, optionally, if the path of the multicast service needs to be switched, reconfiguration information sent by the network side includes at least one of the following during the process of cell switching: second indication information used to indicate a PDCP layer operation performed by the terminal, third indication information used to indicate a RLC layer operation performed by the terminal, RLC layer reconfiguration information, and PDCP layer reconfiguration information.

In this embodiment of the present application, if cell switching is performed, the second indication information includes at least one of the following:

indication information indicating whether the terminal needs to perform PDCP layer re-establishment;

indication information indicating whether the terminal needs to perform data recovery on a PDCP layer;

indication information indicating whether the terminal performs an Acknowledged Mode (AM) or an Unacknowledged Mode (UM) operation on the PDCP layer;

indication information indicating whether the terminal needs to perform PDCP layer reset, release, or new establishment operation;

indication information indicating whether a receiving status variable of a PDCP SN of the terminal needs to be kept; and indication information indicating whether the terminal needs to send the PDCP status report after accessing the target cell.

In this embodiment of the present application, if the path switching of the multicast service is performed, the second indication information includes at least one of the following:

indication information indicating whether the terminal needs to perform data recovery on a PDCP layer;

indication information indicating whether the terminal needs to send a PDCP status report.

In the embodiment of the present application, the method further includes:

if the PTP RLC entity is configured in the reconfiguration information of the multicast service or the target MRB of the multicast service, and the mode of the PTP RLC entity is RLC AM, defaulting that the PDCP SN of the multicast service or the target MRB of the multicast service before reconfiguration is synchronized with that after reconfiguration;

and/or if there is a one-to-one mapping relationship between each QoS flow and each MRB of the multicast service before and after reconfiguration, defaulting that the PDCP SN of the multicast service or the target MRB of the multicast service before reconfiguration is synchronized with that after reconfiguration.

In this embodiment of the present application, performing corresponding layer 2 processing according to the reconfiguration information includes at least one of the following:

re-establishing the PDCP layer;

performing data recovery on the PDCP layer;

resetting, releasing, or newly establishing the PDCP layer;

performing an AM or UM operation on the PDCP layer;

sorting data of the multicast service received before and after the reconfiguration according to PDCP SNs, and submitting the data to the upper layer according to ascending order of the PDCP SNs;

sorting the data of the multicast service received before the reconfiguration according to PDCP SNs, submitting the data to the upper layer according to ascending order of the PDCP SNs, resetting a PDCP receiving status variable of the multicast service to an initial value, sorting, according to PDCP SNs, the data of the multicast service received after reconfiguration, and submitting the data to the upper layer according to ascending order of the PDCP SNs;

sending a PDCP status report on a target PTP path of the multicast service; and resetting, releasing, or newly establishing the RLC layer.

In the embodiment of the present application, because the MRB of the multicast service may have various combination configurations of multiple paths, for example, only use PTM path for transmission, only use PTP path for transmission, or use both PTM path for transmission and PTP path for transmission, the network side needs to explicitly or implicitly indicate to the terminal whether the corresponding PDCP layer needs to perform an AM or UM operation.

The so-called explicit indication means that the network side instructs the terminal PDCP layer to perform an AM or UM operation through explicit instructions. For example, 1 bit indicates whether PDCP SNs of multicast services of the target cell and the source cell or target MRBs of the multicast services are synchronized.

The implicit indication means that the terminal can determine, through the reconfiguration information of the RLC layer, that the PDCP layer performs the AM or UM operation.

The explicit indication is more flexible, and implicit indication has no additional overheads.

That is, in this embodiment of the application, performing an AM or UM operation on the PDCP layer includes:

performing an AM or UM operation on the PDCP layer according to the indication information indicating that the terminal performs an AM or UM operation on the PDCP layer in the reconfiguration information (that is, explicit indication);

or performing an AM or UM operation on the PDCP layer according to the RLC layer reconfiguration information in the reconfiguration information (that is, implicit indication).

In this embodiment of the present application, performing an AM or UM operation on the PDCP layer according to the RLC layer configuration information in the reconfiguration information includes at least one of the following:

if the reconfiguration information indicates that only a PTP RLC entity or a PTM RLC entity is configured for the target MRB of the multicast service (that is, only a PTP leg or only a PTM leg is configured), and the mode of the configured RLC entity is RLC AM, performing an AM operation on the PDCP layer;

if the reconfiguration information indicates that only a PTP RLC entity or a PTM RLC entity is configured for the target MRB of the multicast service (that is, only a PTP leg or only a PTM leg is configured), and the mode of the configured RLC entity is RLC UM, performing an UM operation on the PDCP layer;

if the reconfiguration information indicates that a PTP RLC entity and a PTM RLC entity are both configured for the target MRB of the multicast service (that is, a PTP leg and a PTM leg are configured at the same time), and modes of the PTP RLC entity and the PTM RLC entity are both RLC AM, performing an AM operation on the PDCP layer; and if the reconfiguration information indicates that a PTP RLC entity and a PTM RLC entity are both configured for the target MRB of the multicast service (that is, a PTP leg and a PTM leg are configured at the same time), and modes of the PTP RLC entity and the PTM RLC entity are both RLC UM, performing a UM operation on the PDCP layer; and if the reconfiguration information indicates that a PTP RLC entity and a PTM RLC entity are both configured for the target MRB of the multicast service (that is, a PTP leg and a PTM leg are configured at the same time), and the mode of the PTP RLC entity is RLC AM and the mode of the PTM RLC entity is RLC UM, performing an AM or UM operation on the PDCP layer.

In this embodiment of the present application, performing corresponding layer 2 processing according to the reconfiguration information includes at least one of the following:

(1) for the PDCP AM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs.

In the embodiment of this application, synchronization between PDCP SNs before and after reconfiguration can not be achieved in all cases, or synchronization between PDCP SNs is not required in some cases. In such cases, it is also necessary to regulate the L2 layer processing behavior of the UE, to ensure continuous reception as much as possible.

For example, data of the multicast service received from the source cell is sorted according to PDCP SNs, and submitted in ascending order of the PDCP SNs, for example, the PDCP SNs of the received data is 0-5, 7, 8, and 10, which is equivalent to 6 and 9 are missing. 0-5 are submitted to the upper layer in sequence, 7-10 are cached in the receiving buffer, and 6 and 9 are waited for. When receiving the cell switching instruction or the path switching instruction of the multicast service, the data (7, 8, 10) in the current receiving buffer is also submitted to the upper layer in ascending order, and then the PDCP receiving status variable of the multicast service is reset is the initial value, receiving the data of the multicast service of the target cell is started, the data is sorted according to the PDCP SNs, and submitted to the upper layer according to ascending order of the PDCP SNs.

(2) for the PDCP AM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP SNs.

If the UE supports PDCP SN synchronization after reconfiguration, the PDCP SN reception status variable and data in the receiving cache of the UE before reconfiguration can continue to be reserved, and the data of the multicast service received before and after reconfiguration is sorted according to the PDCP SNs and submitted to the upper layer in the ascending order of the PDCP SNs. For example, the PDCP SNs of the data received in the source cell=0, 1, 2, 4, 5, and the PDCP SNs of the data received in the target cell=3, 4, 5, 6 . . . , and then the UE determines that 4 and 5 of the target cell are repeatedly received and 3 just makes up for the gap, and therefore sorts PDCP SN=0 to 6 and submits them to the upper layer in ascending order to achieve lossless operation.

(3) for the PDCP AM entity, if the second indication information indicates that the terminal needs to send the PDCP status report, generate and send the PDCP status report according to a current PDCP receiving status.

In the embodiment of this application, the First Missing Count (FMC)+bitmap method can be used to send the PDCP status report, for example, FMC=10 and bitmap=11110000, which means when PDCP SN=0-9, 11 to 14 are received correctly, and when PDCP SN=10, 15 to 18 are not received correctly.

In the embodiment of the present application, after receiving the PDCP status report of the UE, the network side can use the PTP leg to retransmit the missing data packets of the UE to make up for a receiving gap. For example, the PTM on the network side continues to send according to the current situation, the UE receives the first data packet SN=19 on the target PTM leg, the network side uses the PTP leg to transmit the data packets SN=10 and 15 to 18 for the UE, and then the UE can sort all the data packets in order and submit them to the upper layer in ascending order.

In this embodiment of the present application, performing corresponding layer 2 processing according to the reconfiguration information includes at least one of the following.

(1) for the PDCP UM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs.

In the embodiment of this application, synchronization between PDCP SNs before and after reconfiguration can not be achieved in all cases, or synchronization between PDCP SNs is not required in some cases. In such cases, it is also necessary to regulate the L2 layer processing behavior of the UE, to ensure continuous reception as much as possible.

(2) for the PDCP UM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP SNs.

(3) for the PDCP UM entity, sort the data of the multicast service received before the reconfiguration according to PDCP SNs, submitting the data to the upper layer according to ascending order of the PDCP SNs, reset a PDCP receiving status variable of the multicast service to an initial value, sort, according to PDCP SNs, the data of the multicast service received after reconfiguration, and submit the data to the upper layer according to ascending order of the PDCP SNs.

That is, the PDCP UM entity does not need to consider the PDCP SN synchronization, and still resets the PDCP receiving status variable of the multicast service to the initial value (clears the PDCP UM entity of the target cell), and submits the received data before reconfiguration to the upper layer according to the existing ascending order, and then continues to sort the reconfigured data according to respective PDCP SNs, which is equivalent to sorting before and after the reconfiguration is separately performed. Data before reconfiguration is first submitted to the upper level, and then data after reconfiguration is submitted to the upper layer.

In the embodiment of this application, for the PDCP UM entity, there is no PDCP status report sending mechanism, and therefore the network side cannot know the reception status of the UE, and can only rely on the network side for implementation. For example, when a reception status of the source cell is PDCP SN=0-10, 12 to 15 are received correctly, and after the UE accesses the target cell, receiving PDCP SNs=11, 12, 13 . . . , and the UE can delete the duplicate packets, make up for the gap, and submit them to the higher layer in sequence.

In this embodiment of the present application, sorting, according to PDCP SNs, data of the multicast service received after reconfiguration, and submitting the data to the upper layer according to ascending order of the PDCP SNs includes: using the first PDCP SN received after reconfiguration plus 1 as an upper boundary variable of a PDCP receiving window, sorting data of the multicast service received before and after the reconfiguration according to PDCP SNs, and submitting the data to the upper layer according to ascending order of the PDCP SNs.

In this embodiment of the present application, performing corresponding layer 2 processing according to the reconfiguration information includes:

if the second indication information indicates that the terminal needs to reset, release or newly establish the RLC layer, performing at least one of the following:

(1) resetting, releasing, or newly establishing the RLC layer.

For the RLC AM entity (only the PTP leg), because this PTP leg is UE-specific, the network side can independently maintain the status variable of the UE, that is, start to send in the order of PDCP SN=0, 1, 2 . . . , and the terminal receives according to the behavior of the existing RLC AM receiving entity.

(2) For the PTM RLC entity in RLC UM mode, because the PTM leg is common to all UEs, the network side cannot adjust the status variable according to the newly added UE, and can continue to send according to the transmission status of the existing PTM leg, for example, the current order of SN=100, 101, 102 . . . , and then the newly added UE adds 1 to the received first RLC SN and sets it as the upper boundary of the RLC UM receiving window.

(3) For the PTP RLC entity in RLC UM mode, because this PTP leg is UE-specific, the network side can independently maintain the status variable of the UE, that is, start to send in the order of PDCP SN=0, 1, 2 . . . , and the terminal can receive according to the behavior of the existing RLC AM receiving entity, or add 1 to the received first RLC SN 1 and set it as the upper boundary of the RLC UM receiving window.

In this embodiment of the application, re-establishing the PDCP layer includes:

(1) for the re-establishment corresponding to the RLC AM performed on the PDCP layer, the behavior is to maintain the existing PDCP SN receiving status variable;

(2) PDCP AM re-establishment, including header compression reset and security update, because the header compression process of the target cell and the security parameters of the target cell start to be used, and (3) for PDCP UM re-establishment, the UE resets all PDCP SN reception status variables, but if PDCP SN synchronization is supported, in PDCP UM re-establishment after reconfiguration, maintaining the PDCP SN reception status variable similar to that of the AM can also be performed, which is convenient for PDCP SN sorting of data before and after reconfiguration. The default re-establishment behavior is to clear all statuses, similar to creating a new entity.

In this embodiment of the present application, performing, by the terminal, a data recovery operation of the PDCP layer includes:

(1) for the data recovery corresponding to RLC AM performed on the PDCP layer, the behavior is to maintain the PDCP SN receiving status variable, that is, to achieve a similar effect with indication of the above PDCP SN synchronization;

(2) for PDCP UM data recovery, the UE resets all PDCP SN reception status variables, but if PDCP SN synchronization is supported, in PDCP UM re-establishment after reconfiguration, maintaining the PDCP SN reception status variable similar to that of the AM can also be performed, which is convenient for PDCP SN sorting of data before and after reconfiguration; and (3) indication of PDCP AM/UM data recovery does not include header compression reset and security update, and is mostly used when the PDCP entity does not change, such as path switching or synchronous reconfiguration of the cell.

In this embodiment of the present application, the resetting, releasing, or newly establishing the PDCP layer by the terminal includes: clearing all PDCP entities of the source cell, or releasing the existing PDCP entities, and re-establishing a new PDCP entity from the initialization status. This mainly serves to respond to a case, for example, the target cell and the source cell do not maintain PDCP SN synchronization, and therefore maintaining the PDCP SN variable reception status of the source cell is meaningless and sorting cannot be performed. Therefore, clearing is performed in the target cell for restart. For example, although it is a multicast service of the RLC AM, no one-to-one mapping between QoS flows and MRBs is allocated due to its low priority, and therefore PDCP SN synchronization cannot be maintained.

In the embodiment of the present application, the RLC layer operation performed by the terminal includes: the terminal performs RLC reset or release or new establishment. In different cells, the RLC layer has different scheduling methods, and the RLC layer segmentation is completely different from the UM SN allocation. Therefore, the RLC entity in the source cell must be released or reset, and clearing is performed in the target cell again or a new RLC entity is established. In the case of cross-cell, both the PTM leg and the PTP leg require clearing of RLC.

In this embodiment of the application, the UE is in the same cell, and the serving cell does not change. However, due to the configuration change of the multicast service or path switching, there are special operations that require continuous reception. This example takes path switching as an example for illustration, and other situations are similar.

In this embodiment of the present application, if path switching occurs for the multicast service, performing corresponding layer 2 processing according to the reconfiguration information includes at least one of the following:

(1) for the PDCP entity, because an operation is within the same cell, the PDCP entity remains unchanged, and the SN status, header compression and security of the PDCP entity continue to be maintained;

(2) for the PDCP UM entity, since there is no feedback path, there is no place for enhancement, for the UE, the data of the multicast service is received according to a switched path, PDCP SN duplication detection and re-sorting operations are performed at the PDCP entity, and the data is submitted to the upper layer according to ascending order of PDCP SNs;

(3) for the PDCP AM entity, since there is a PTP leg and it is configured as an RLC AM, content that can be enhanced is: if the switched path includes a PTP RLC entity in an activated RLC AM mode, the sending of the PDCP status report is triggered; and (4) for the PDCP AM entity, if a path switching instruction is sent through Layer 1 (L1) signaling or a Medium Access Control Control Element (MAC CE), after the physical layer or the MAC layer receives and decodes the path switching instruction, informing the PDCP layer through an interlayer and receiving, by the PDCP layer, data according to an activated receiving entity in the path switching instruction.

In the process of multicast service path switching, the PTP RLC entity and the PTM RLC entity do not need to be affected, and can continue to proceed according to the existing behaviors of the respective entities.

In this embodiment of the present application, triggering the sending of the PDCP status report includes one of the following:

(1) when the PDCP status report is triggered, the PDCP status report is generated and sent according to the current PDCP reception status, and there is no need to wait for the Hybrid Automatic Repeat reQuest (HARQ) process timer, that is, the current FMC+bitmap, and as long as a PDCP SN is not received correctly at the current moment, it is directly set to 0 in the bitmap, which means that it is not received correctly; and (2) in a case that the PDCP status report is triggered, starting the HARQ process timer, and after the HARQ process timer expires, generating and sending a PDCP status report according to a PDCP receiving status.

The terminal can trigger the PDCP status report when receiving the path switching signaling. However, since one or more PDCP PDUs may be currently performing a HARQ process operation, such as HARQ retx, that is, the current PDCP PDU may succeed in the subsequent HARQ retransmission, the UE can first start a HARQ process timer when the PDCP status report is triggered. The specific value of the HARQ process timer can be configured by the network side or specified by the standard or selected by the UE. After the HARQ process timer expires, the FMC+bitmap value is determined according to the current receiving status and is sent. In this case, compared with the previous immediate sending method, it can effectively avoid that the UE sends a NACK incorrectly, that is, it is not received correctly during the reporting trigger, but it is correctly received through HARQ retransmission during the HARQ process timer. In this way, this PDCP SN can be sent as an ACK after the HARQ process timer expires, avoiding redundant retransmission.

Please refer to FIG. 4. The embodiment of the present application also provides a multicast service configuration method, which is executed by a network side device, including:

Step 41: Send reconfiguration information of a multicast service to a terminal, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information.

In this embodiment of the present application, if cell switching is performed, the second indication information includes at least one of the following:

indication information indicating whether the terminal needs to perform PDCP layer re-establishment;

indication information indicating whether the terminal needs to perform data recovery on a PDCP layer;

indication information indicating whether the terminal performs an AM or UM operation on the PDCP layer;

indication information indicating whether the terminal needs to perform PDCP layer reset, release, or new establishment;

indication information indicating whether a receiving status variable of a PDCP SN of the terminal needs to be kept; and indication information indicating whether the terminal needs to send the PDCP status report after accessing the target cell.

In this embodiment of the present application, if the path switching of the multicast service is performed, the second indication information includes at least one of the following:

indication information indicating whether the terminal needs to perform data recovery on a PDCP layer; and indication information indicating whether the terminal needs to send a PDCP status report.

In general, the network side device gives priority to the lossless reception configuration for data flows with higher block error rate requirements in QoS requirements, for example, the block error rate requirement is lower than $10^\wedge-5$ or $10^\wedge-6$. In addition, a PTP leg is generally configured at the same time, and the PTP leg is configured as an RLC AM.

For cell switching scenarios, in order to achieve lossless reception, a PTP leg must be configured in the target cell, and the PTP leg is configured as an RLC AM. At the same time, if there are other users receiving the same multicast service in the target cell, a PTM leg must also be configured at the same time, and the PTP leg can be configured as an RLC UM to send multicast service data to multiple terminals at the same time through point-to-multipoint, which has high resource efficiency. The reconfiguration information for the multicast service in the target cell can be sent to the source cell through interface signaling (Xn interface signaling), and the source cell then sends it to the switching terminal through switching signaling.

In the embodiment of this application, the source cell and the target cell can determine through the interaction of the Xn interface whether the PDCP SN synchronization is satisfied, for example, the source cell and the target cell exchange through an explicit process whether the PDCP SN of an MRB corresponding to the TMGI service is synchronized, or the source cell can determine through an implicit process whether the MRB supports PDCP SN synchronization. For example, the source cell and the target cell are configured with a one-to-one mapping relationship between a QoS flow and an MRB, and therefore PDCP SN synchronization is considered to be supported.

In this embodiment of the present application, indication information indicating whether the terminal needs to perform PDCP layer re-establishment includes:

(1) for indication of the re-establishment corresponding to RLC AM performed on the PDCP layer, the behavior is to maintain the PDCP SN receiving status variable, that is, to achieve a similar effect with indication of the above PDCP SN synchronization;

(2) indication of PDCP AM re-establishment, further including header compression reset and security update, because the header compression process of the target cell and the security parameters of the target cell start to be used; and (3) indication of PDCP UM re-establishment.

In this embodiment of the present application, optionally, the indication information indicating whether the terminal needs to perform a data recovery operation of the PDCP layer includes:

(1) for the indication of data recovery corresponding to RLC AM at the PDCP layer, the behavior is also maintaining the existing receiving status and SN variable, that is, it achieves a similar effect with that of the above PDCP SN sync indication, and one of the two can be selected based on this effect;

(2) indication of PDCP UM data recovery; and (3) indication of PDCP AM/UM data recovery does not include header compression reset and security update, and is mostly used when the PDCP entity does not change, such as path switching or synchronous reconfiguration of the cell.

In the embodiment of this application, for whether the terminal needs to send the PDCP status report, the PDCP status report is an uplink feedback process, and therefore there must be a PTP leg. The PTP leg is configured with RLC AM, and the PDCP status report is transmitted on this PTP leg; if the target PDCP is UM, feedback of the PDCP status report cannot be configured because there is no uplink channel for bearing and transmission.

In this embodiment of the present application, the third indication information used to indicate the RLC layer operation performed by the terminal includes: an indication used to indicate whether the terminal performs RLC reset or release or new establishment.

In the embodiment of this application, if an MRB has only an RLC UM leg, that is, PTM is configured as RLC UM, or PTM and PTP are configured as RLC UM, a certain degree of continuous reception can also be achieved in the case of PDCP SN synchronization.

It should be noted that, the multicast service receiving method provided in the embodiments of the present application may be executed by a multicast service receiving apparatus, or a control module in the multicast service receiving apparatus for executing the multicast service receiving method. In the embodiments of the present application, an example in which the multicast service receiving apparatus performs the multicast service receiving method is used to describe the multicast service receiving apparatus provided in the embodiments of the present application.

Figure 5:
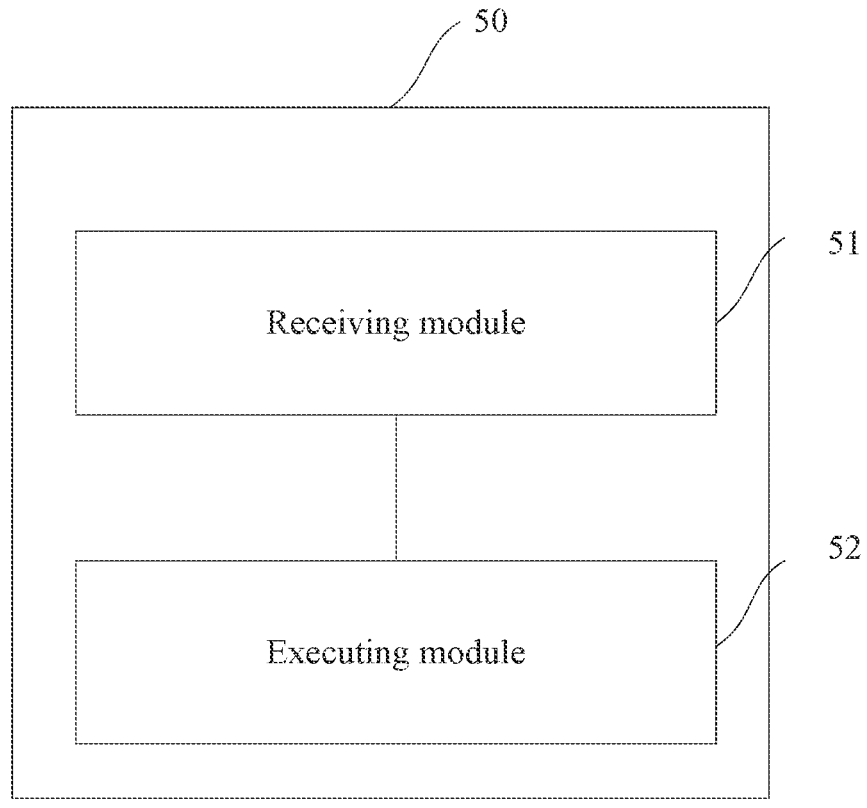
FIG. 5 is a schematic structural diagram of a multicast service receiving apparatus according to an embodiment of the present application.

Referring to FIG. 5, an embodiment of the present application further provides a multicast service receiving apparatus 50, including:

a receiving module 51, configured to receive reconfiguration information of a multicast service sent by a network side device, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information; and The executing module 52 is configured to execute corresponding layer 2 processing according to the reconfiguration information.

In some implementations, the second indication information includes at least one of the following:

indication information indicating whether the terminal needs to perform PDCP layer re-establishment;

indication information indicating whether the terminal needs to perform data recovery on a PDCP layer; and indication information indicating whether the terminal performs an AM or UM operation on the PDCP layer;

indication information indicating whether the terminal needs to perform PDCP layer reset, release or new establishment;

indication information indicating whether a receiving status variable of a PDCP SN of the terminal needs to be kept; and indication information indicating whether the terminal needs to send a PDCP status report.

In some implementations, the executing module 52 being configured to execute corresponding layer 2 processing according to the reconfiguration information includes at least one of the following:

re-establishing the PDCP layer;

performing data recovery on the PDCP layer;

resetting, releasing, or newly establishing the PDCP layer;

performing an AM or UM operation on the PDCP layer;

sorting data of the multicast service received before and after the reconfiguration according to PDCP SNs, and submitting the data to the upper layer according to ascending order of the PDCP SNs;

sorting the data of the multicast service received before the reconfiguration according to PDCP SNs, submitting the data to the upper layer according to ascending order of the PDCP SNs, resetting a PDCP receiving status variable of the multicast service to an initial value, sorting, according to PDCP SNs, the data of the multicast service received after reconfiguration, and submitting the data to the upper layer according to ascending order of the PDCP SNs;

sending a PDCP status report on a target PTP path of the multicast service; and resetting, releasing or newly establishing the RLC layer.

In some implementations, the executing module 52 is configured to perform an AM or UM operation on the PDCP layer according to the indication information indicating that the terminal performs an AM or UM operation on the PDCP layer in the reconfiguration information;

or the executing module 52 is configured to perform an AM or UM operation on the PDCP layer according to the RLC layer reconfiguration information in the reconfiguration information.

In some implementations, the executing module 52 is also configured to execute at least one of the following:

if the reconfiguration information indicates that only a PTP RLC entity or a PTM RLC entity is configured for the target MRB of the multicast service, and the mode of the configured RLC entity is RLC AM, performing an AM operation on the PDCP layer;

if the reconfiguration information indicates that only a PTP RLC entity or a PTM RLC entity is configured for the target MRB of the multicast service, and the mode of the configured RLC entity is RLC UM, performing an UM operation on the PDCP layer;

if the reconfiguration information indicates that a PTP RLC entity and a PTM RLC entity are both configured for the target MRB of the multicast service, and modes of the PTP RLC entity and the PTM RLC entity are both RLC AM, performing an AM operation on the PDCP layer;

if the reconfiguration information indicates that a PTP RLC entity and a PTM RLC entity are both configured for the target MRB of the multicast service, and modes of the PTP RLC entity and the PTM RLC entity are both RLC UM, performing a UM operation on the PDCP layer; and if the reconfiguration information indicates that a PTP RLC entity and a PTM RLC entity are both configured for the target MRB of the multicast service, and the mode of the PTP RLC entity is RLC AM and the mode of the PTM RLC entity is RLC UM, performing an AM or UM operation on the PDCP layer.

In some implementations, the multicast service receiving apparatus further includes:

a first processing module, configured to: if the PTP RLC entity is configured in the reconfiguration information of the multicast service or the target MRB of the multicast service, and the mode of the PTP RLC entity is RLC AM, default that the PDCP SN of the multicast service or the target MRB of the multicast service before reconfiguration is synchronized with that after reconfiguration;

and/or the second processing module is configured to: if there is a one-to-one mapping relationship between each QoS flow and each MRB of the multicast service before and after reconfiguration, default that the PDCP SN of the multicast service or the target MRB of the multicast service before reconfiguration is synchronized with that after reconfiguration.

In some implementations, the executing module 52 is configured to execute at least one of the following:

for the PDCP AM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs;

for the PDCP AM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP Sns; and for the PDCP AM entity, if the second indication information indicates that the terminal needs to send the PDCP status report, generate and send the PDCP status report according to a current PDCP receiving status.

In some implementations, the executing module 52 is configured to execute at least one of the following:

for the PDCP UM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs;

for the PDCP UM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP Sns; and for the PDCP UM entity, sort the data of the multicast service received before the reconfiguration according to PDCP SNs, submitting the data to the upper layer according to ascending order of the PDCP SNs, reset a PDCP receiving status variable of the multicast service to an initial value, sort, according to PDCP SNs, the data of the multicast service received after reconfiguration, and submit the data to the upper layer according to ascending order of the PDCP SNs.

In some implementations, the execution module 52 is further configured to use the first PDCP SN received after reconfiguration plus 1 as an upper boundary variable of a PDCP receiving window, sort data of the multicast service received before and after the reconfiguration according to PDCP SNs, and submit the data to the upper layer according to ascending order of the PDCP SNs.

In some implementations, the executing module 52 is further configured to: if the second indication information indicates that the terminal needs to reset, release, or newly establish the RLC layer, perform at least one of the following:

resetting, releasing, or newly establishing the RLC layer; and for the PTM RLC entity, setting the first received RLC SN plus 1 as an upper boundary of an RLC UM receiving window.

In some implementations, if path switching occurs for the multicast service, the executing module 52 is configured to execute at least one of the following:

for the PDCP UM entity, receiving the data of the multicast service according to a switched path, performing PDCP SN duplication detection and re-sorting operations at the PDCP entity, and submitting the data to the upper layer according to ascending order of PDCP SNs;

for the PDCP AM entity, if the switched path includes a PTP RLC entity in an activated RLC AM mode, triggering the sending of the PDCP status report; and for the PDCP AM entity, if a path switching instruction is sent through layer 1 signaling or a MAC CE, after the physical layer or the MAC layer receives and decodes the path switching instruction, informing the PDCP layer through an interlayer and receiving, by the PDCP layer, data according to an activated receiving entity in the path switching instruction.

In some implementations, the executing module 52 is also configured to execute one of the following:

in a case that the PDCP status report is triggered, generating and sending the PDCP status report according to a current PDCP receiving status; and in a case that the PDCP status report is triggered, starting the HARQ process timer, and after the HARQ process timer expires, generating and sending a PDCP status report according to a PDCP receiving status.

The multicast service receiving apparatus in the embodiments of the present application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a Network Attached Storage (NAS), a personal computer, a television, an automated teller machine, or a self-service machine. This is not specifically limited in the embodiments of this application.

The multicast service receiving apparatus in the embodiments of the present application may be an apparatus with an operating system. The operating system may be an Android operating system, may be an iOS operating system, or may be another possible operating system. This is not specifically limited in this embodiment of this application.

The multicast service receiving apparatus according to embodiments of the present disclosure can implement the processes in the method embodiments in FIG. 3, and achieve the same technical effect. To avoid repetition, details are not described herein again.

It should be noted that, the multicast service configuration method provided in the embodiments of the present application may be executed by a multicast service configuration apparatus, or a control module in the multicast service configuration apparatus for executing the multicast service configuration method. In the embodiments of the present application, an example in which the multicast service configuration apparatus performs the multicast service configuration method is used to describe the multicast service configuration apparatus provided in the embodiments of the present application.

Figure 6:
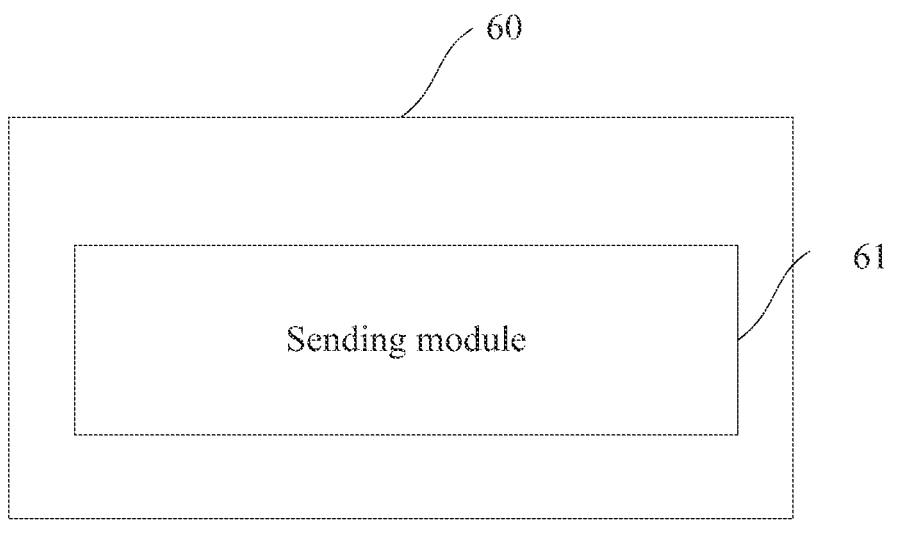
FIG. 6 is a schematic structural diagram of a multicast service configuration apparatus according to an embodiment of the present application.

Referring to FIG. 6, an embodiment of the present application further provides a multicast service configuration apparatus 60, including:

a sending module 61, configured to send reconfiguration information of a multicast service to a terminal, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information. Optionally, the second indication information includes at least one of the following:

indication information indicating whether the terminal needs to perform PDCP layer re-establishment;

indication information indicating whether the terminal needs to perform data recovery on a PDCP layer; and indication information indicating whether the terminal performs an AM or UM operation on the PDCP layer;

indication information indicating whether the terminal needs to perform PDCP layer reset, release or new establishment;

indication information indicating whether a receiving status variable of a PDCP SN of the terminal needs to be kept; and indication information indicating whether the terminal needs to send a PDCP status report.

The multicast service receiving apparatus according to embodiments of the present disclosure can implement the processes in the method embodiments in FIG. 4, and achieve the same technical effect. To avoid repetition, details are not described herein again.

Figure 7:
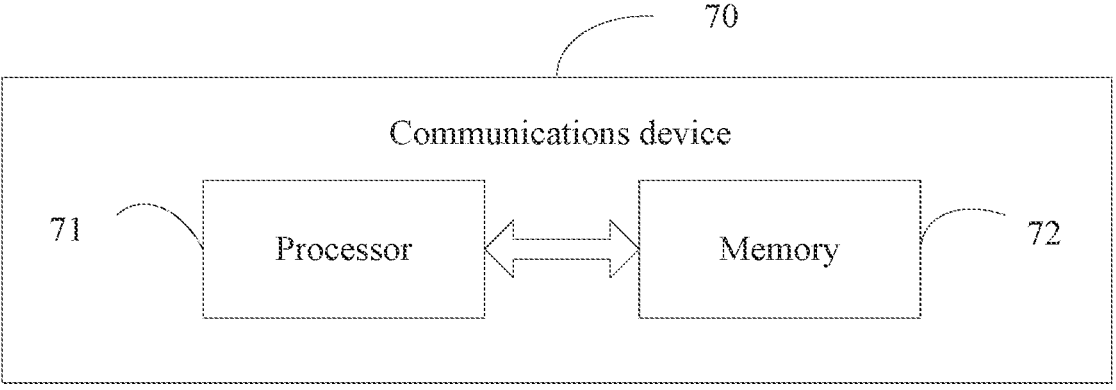
FIG. 7 is a schematic diagram of a structure of a communications device according to an embodiment of this application.

As shown in FIG. 7, an embodiment of the present application also provides a communication device 70, including a processor 71, a memory 72, and programs or instructions stored in the memory 72 and operable on the processor 71, for example, when the communication device 70 is a terminal, when the programs or instructions are executed by the processor 71, each process of the above embodiment of the multicast service receiving method can be realized, and the same technical effect can be achieved. When the communication device 70 is a network side device, when the programs or instructions are executed by the processor 71, each process of the above embodiment of the multicast service configuration method is performed, and the same technical effect can be achieved. To avoid repetition, details are not repeated herein.

Figure 8:
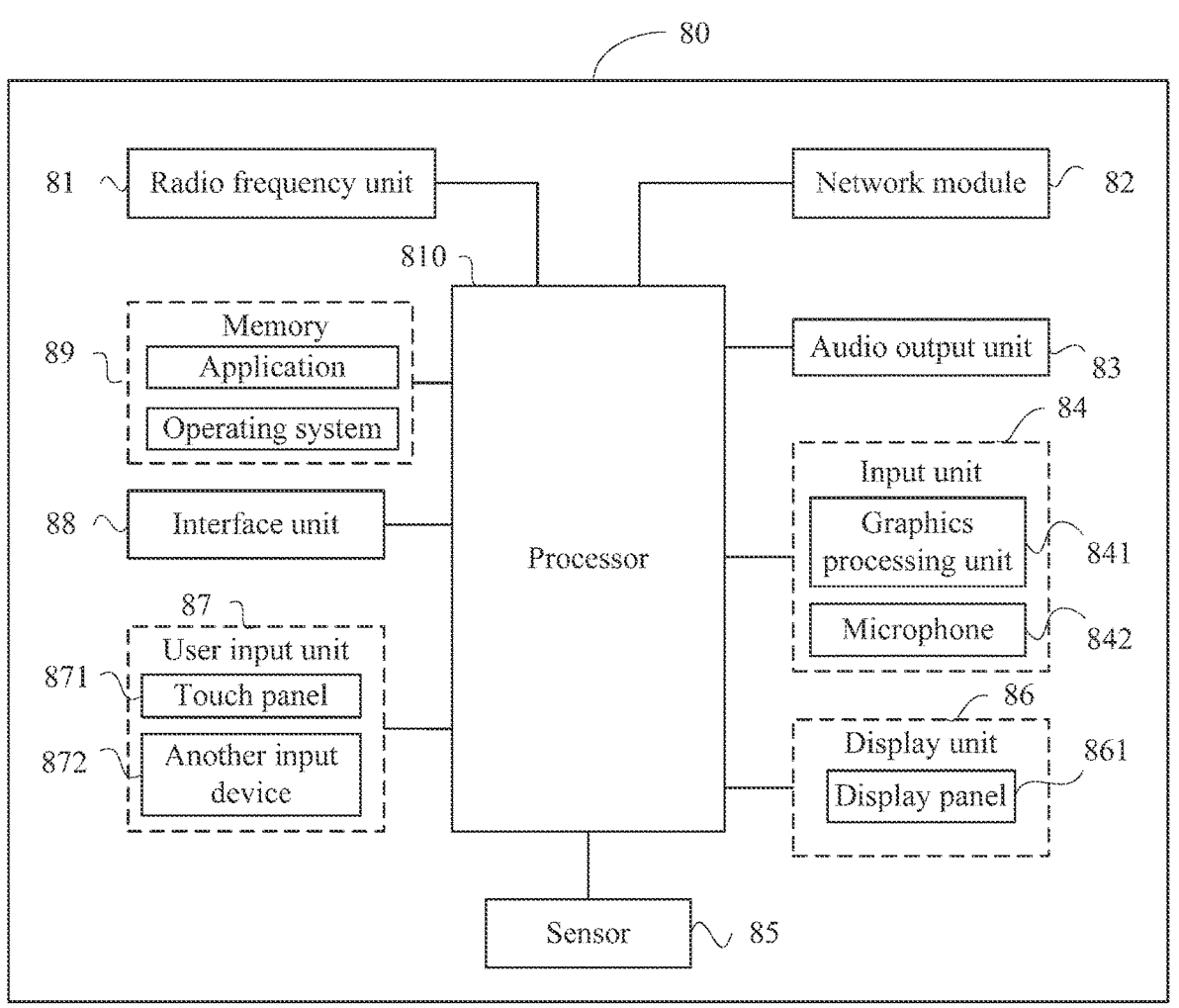
FIG. 8 is a schematic diagram of a hardware structure of a terminal according to an embodiment of this application.

FIG. 8 is a schematic diagram of a hardware structure of a terminal according to an embodiment of this application. A terminal 80 includes but is not limited to components such as a radio frequency unit 81, a network module 82, an audio output unit 83, an input unit 84, a sensor 85, a display unit 86, a user input unit 87, an interface unit 88, a memory 89, and a processor 810.

A person skilled in the art can understand that the terminal 80 may further include a power supply (for example, a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 84 may include a Graphics Processing Unit (GPU) 841 and a microphone 842, and the graphics processing unit 841 processes image data of a still picture or a video obtained by an image capture apparatus (for example, a camera) in a video capture mode or an image capture mode. The display unit 86 may include a display panel 861. In some implementations, the display panel 861 may be configured in a form such as a liquid crystal display or an organic light-emitting diode. The user input unit 87 includes a touch panel 871 and another input device 872. The touch panel 871 is also referred to as a touchscreen. The touch panel 871 may include two parts: a touch detection apparatus and a touch controller. The another input device 872 may include but is not limited to a physical keyboard, a functional button (such as a volume control button or a power on/off button), a trackball, a mouse, and a joystick. Details are not described herein.

In this embodiment of this application, the radio frequency unit 81 receives downlink data from a network side device and then sends the downlink data to the processor 810 for processing; and sends uplink data to the network side device. Generally, the radio frequency unit 81 includes but is not limited to an antenna, at least one amplifier, a transceiver, a coupler, a low noise amplifier, a duplexer, and the like.

The memory 89 may be configured to store a software program or an instruction and various data. The memory 89 may mainly include a program or instruction storage area and a data storage area, where the program or instruction storage area may store an operating system, an application program or instructions required by at least one function (for example, a sound playback function, or an image playback function) and the like. In addition, the memory 89 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 810 may include one or more processing units. In some implementations, an application processor and a modem processor may be integrated into the processor 810. The application processor mainly processes an operating system, a user interface, an application, an instruction, or the like. The modem processor mainly processes wireless communications, for example, a baseband processor. It can be understood that, alternatively, the modem processor may not be integrated into the processor 810.

The radio frequency unit 81 is configured to receive reconfiguration information of a multicast service sent by a network side device, where the reconfiguration information includes at least one of the following: first indication information used to indicate whether a PDCP SN of a multicast service or a target MRB of the multicast service before reconfiguration is synchronized with that after reconfiguration, second indication information used to indicate a PDCP layer operation performed by the terminal, third indication information used to indicate a RLC layer operation performed by the terminal, RLC layer reconfiguration information, and PDCP layer reconfiguration information.

The processor 810 is configured to execute corresponding layer 2 processing according to the reconfiguration information.

In some implementations, the second indication information includes at least one of the following:

indication information indicating whether the terminal needs to perform PDCP layer re-establishment;

indication information indicating whether the terminal needs to perform data recovery on a PDCP layer; and indication information indicating whether the terminal performs an AM or UM operation on the PDCP layer;

indication information indicating whether the terminal needs to perform PDCP layer reset, release, or new establishment;

indication information indicating whether a receiving status variable of a PDCP SN of the terminal needs to be kept; and indication information indicating whether the terminal needs to send a PDCP status report.

In some implementations, the processor 810 is configured to perform at least one of the following:

re-establishing the PDCP layer;

performing data recovery on the PDCP layer;

resetting, releasing, or newly establishing the PDCP layer;

performing an AM or UM operation on the PDCP layer;

sorting data of the multicast service received before and after the reconfiguration according to PDCP SNs, and submitting the data to the upper layer according to ascending order of the PDCP SNs;

sorting the data of the multicast service received before the reconfiguration according to PDCP SNs, submitting the data to the upper layer according to ascending order of the PDCP SNs, resetting a PDCP receiving status variable of the multicast service to an initial value, sorting, according to PDCP SNs, the data of the multicast service received after reconfiguration, and submitting the data to the upper layer according to ascending order of the PDCP SNs;

sending a PDCP status report on a target PTP path of the multicast service; and resetting, releasing or newly establishing the RLC layer.

In some implementations, the processor 810 is configured to perform an AM or UM operation on the PDCP layer according to the indication information indicating that the terminal performs an AM or UM operation on the PDCP layer in the reconfiguration information;

or the processor 810 is configured to perform an AM or UM operation on the PDCP layer according to the RLC layer reconfiguration information in the reconfiguration information.

In some implementations, the processor 810 is configured to perform at least one of the following:

if the reconfiguration information indicates that only a PTP RLC entity or a PTM RLC entity is configured for the target MRB of the multicast service, and the mode of the configured RLC entity is RLC AM, performing an AM operation on the PDCP layer;

if the reconfiguration information indicates that only a PTP RLC entity or a PTM RLC entity is configured for the target MRB of the multicast service, and the mode of the configured RLC entity is RLC UM, performing an UM operation on the PDCP layer;

if the reconfiguration information indicates that a PTP RLC entity and a PTM RLC entity are both configured for the target MRB of the multicast service, and modes of the PTP RLC entity and the PTM RLC entity are both RLC AM, performing an AM operation on the PDCP layer;

if the reconfiguration information indicates that a PTP RLC entity and a PTM RLC entity are both configured for the target MRB of the multicast service, and modes of the PTP RLC entity and the PTM RLC entity are both RLC UM, performing a UM operation on the PDCP layer; and if the reconfiguration information indicates that a PTP RLC entity and a PTM RLC entity are both configured for the target MRB of the multicast service, and the mode of the PTP RLC entity is RLC AM and the mode of the PTM RLC entity is RLC UM, performing an AM or UM operation on the PDCP layer.

In some implementations, the processor 810 is configured to: if the PTP RLC entity is configured in the reconfiguration information of the multicast service or the target MRB of the multicast service, and the mode of the PTP RLC entity is RLC AM, default that the PDCP SN of the multicast service or the target MRB of the multicast service before reconfiguration is synchronized with that after reconfiguration;

and/or the processor 810 is configured to: if there is a one-to-one mapping relationship between each QoS flow and each MRB of the multicast service before and after reconfiguration 810 default that the PDCP SN of the multicast service or the target MRB of the multicast service before reconfiguration is synchronized with that after reconfiguration.

In some implementations, the processor 810 is configured to perform at least one of the following:

for the PDCP AM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs;

for the PDCP AM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP Sns; and for the PDCP AM entity, if the second indication information indicates that the terminal needs to send the PDCP status report, generate and send the PDCP status report according to a current PDCP receiving status.

In some implementations, the processor 810 is configured to perform at least one of the following:

for the PDCP UM entity, if the second indication information indicates that the receiving status variable of the PDCP SN does not need to be kept, and/or the first indication information indicates that the PDCP SN of the multicast service or the target MRB of the multicast service before reconfiguration is not synchronized with that after reconfiguration, sort, according to PDCP SNs, data of the multicast service received before reconfiguration, submit the data to the upper layer according to ascending order of the PDCP SNs, reset the PDCP reception status variable of the multicast service to the initial value, sort, according to PDCP SNs, data of the multicast service received after reconfiguration, and submit the data to the upper layer according to ascending order of the PDCP SNs;

for the PDCP UM entity, if the second indication information indicates that the receiving status variable of the PDCP SN needs to be kept, and/or the first indication information indicates that the PDCP SN of the multicast service or the target MRB of the multicast service before reconfiguration is synchronized with that after reconfiguration, reserve the PDCP SN receiving status variable and data of the multicast service in the receiving cache, sort, according to PDCP SNs, data of the multicast service received before and after reconfiguration, and submit the data to the upper layer according to ascending order of the PDCP Sns; and for the PDCP UM entity, sort the data of the multicast service received before the reconfiguration according to PDCP SNs, submitting the data to the upper layer according to ascending order of the PDCP SNs, reset a PDCP receiving status variable of the multicast service to an initial value, sort, according to PDCP SNs, the data of the multicast service received after reconfiguration, and submit the data to the upper layer according to ascending order of the PDCP SNs.

In some implementations, the processor 810 is configured to use the first PDCP SN received after reconfiguration plus 1 as an upper boundary variable of a PDCP receiving window, sort data of the multicast service received before and after the reconfiguration according to PDCP SNs, and submit the data to the upper layer according to ascending order of the PDCP SNs.

In some implementations, the processor 810 is configured to: if the second indication information indicates that the terminal needs to reset, release or newly establish the RLC layer, perform at least one of the following:

resetting, releasing, or newly establishing the RLC layer; and for the RLC UM entity, setting the first received RLC SN plus 1 as an upper boundary of an RLC UM receiving window.

In some implementations, the processor 810 is configured to perform at least one of the following:

for the PDCP UM entity, receiving the data of the multicast service according to a switched path, performing PDCP SN duplication detection and re-sorting operations at the PDCP entity, and submitting the data to the upper layer according to ascending order of PDCP SNs;

for the PDCP AM entity, if the switched path includes a PTP RLC entity in an activated RLC AM mode, triggering the sending of the PDCP status report; and for the PDCP AM entity, if a path switching instruction is sent through layer 1 signaling or a MAC CE, after the physical layer or the MAC layer receives and decodes the path switching instruction, informing the PDCP layer through an interlayer and receiving, by the PDCP layer, data according to an activated receiving entity in the path switching instruction.

In some implementations, the processor 810 is configured to perform one of the following:

in a case that the PDCP status report is triggered, generating and sending the PDCP status report according to a current PDCP receiving status; and in a case that the PDCP status report is triggered, starting the HARQ process timer, and after the HARQ process timer expires, generating and sending a PDCP status report according to a PDCP receiving status.

Figure 9:
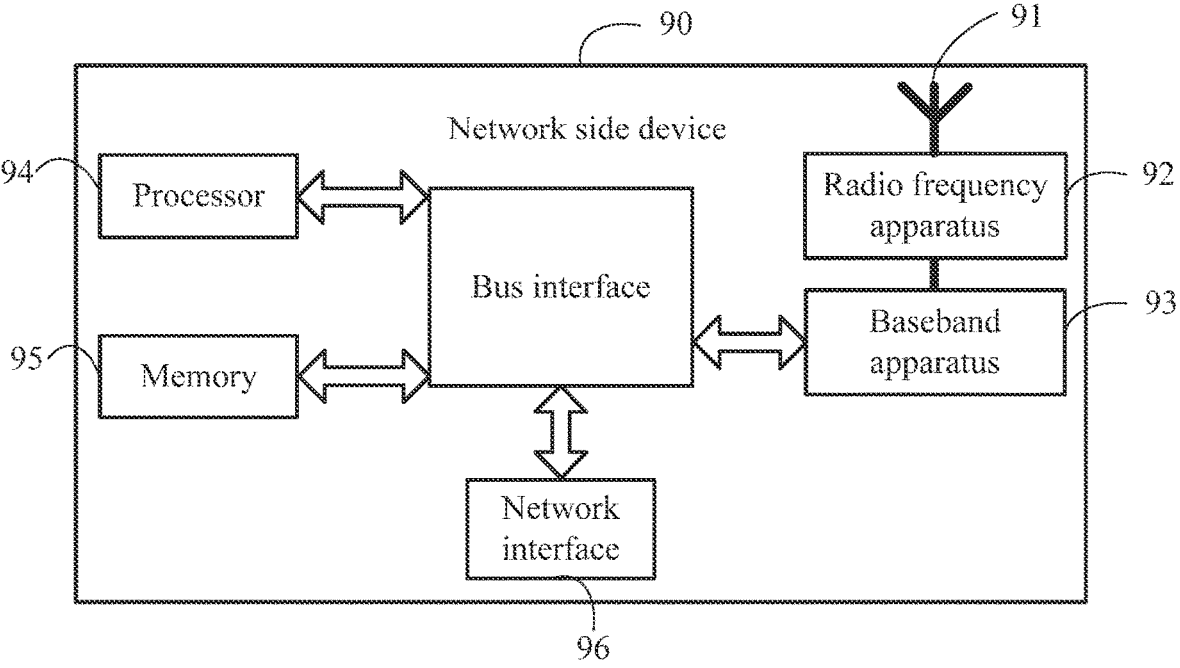
FIG. 9 is a schematic diagram of a hardware structure of a network side device according to an embodiment of this application.

An embodiment of this application further provides a network side device. As shown in FIG. 9, the network side device 900 includes an antenna 91, a radio frequency apparatus 92, and a baseband apparatus 93. The antenna 91 is connected to the radio frequency apparatus 92. In an uplink direction, the radio frequency apparatus 92 receives information through the antenna 91, and sends the received information to the baseband apparatus 93 for processing. In a downlink direction, the baseband apparatus 93 processes information that needs to be sent, and sends processed information to the radio frequency apparatus 92. The radio frequency apparatus 92 processes the received information, and sends processed information by using the antenna 91.

The frequency band processing apparatus may be located in the baseband apparatus 93. The method performed by the network side device in the above embodiment may be implemented in the baseband apparatus 93. The baseband apparatus 93 includes a processor 94 and a memory 95.

The baseband apparatus 93 may include, for example, at least one baseband board, where a plurality of chips are disposed on the baseband board. As shown in FIG. 9, one chip is, for example, the processor 94, which is connected to the memory 95, so as to invoke a program in the memory 95 to perform operations of the network device shown in the foregoing method embodiment.

The baseband apparatus 93 may further include a network interface 96, configured to exchange information with the radio frequency apparatus 92. For example, the interface is a Common Public Radio Interface (CPRI for short).

In some implementations, the network side device in this embodiment of this application further includes an instruction or a program that is stored in the memory 95 and that can be run on the processor 94. The processor 94 invokes the instruction or the program in the memory 95 to perform the method performed by the modules shown in FIG. 4, and a same technical effect is achieved. To avoid repetition, details are not described herein again.

An embodiment of the present application further provides a readable storage medium. The readable storage medium stores a program or an instruction, and when the program or the instruction is executed by a processor, the various processes of the foregoing embodiments of the multicast service receiving method and the multicast service configuration method are performed and the same technical effects can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run the program or instruction of the network side device to realize each process of the embodiments of the multicast service receiving method or the multicast service configuration method, and can achieve the same technical effect. To avoid repetition, details are not repeated herein.

It should be understood that the chip mentioned in this embodiment of this application may also be referred to as a system-level chip, a system chip, a chip system, or an on-chip system chip.

The embodiment of the present application further provides a program product, the program product is stored in a non-volatile storage medium, and the program product is executed by at least one processor to implement each process of the embodiments of the multicast service receiving method or the multicast service configuration method, and can achieve the same technical effect. To avoid repetition, it will not be repeated herein.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the related art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A multicast service receiving method, executed by a terminal, comprising:

receiving reconfiguration information of a multicast service sent by a network side device, wherein the reconfiguration information comprises at least one of the following:

first indication information used to indicate whether a Packet Data Convergence Protocol (PDCP) Serial Number (SN) of the multicast service or a target Multicast Broadcast Multicast Service (MBMS) Radio Bearer (MRB) of the multicast service before reconfiguration is synchronized with that after the reconfiguration;

second indication information used to indicate a PDCP layer operation performed by the terminal; or third indication information used to indicate a Radio Link Control (RLC) layer operation performed by the terminal, RLC layer configuration information, and PDCP layer configuration information; and performing corresponding layer 2 processing according to the reconfiguration information, comprising:

for a PDCP Unacknowledgment Mode (UM) entity, when the second indication information indicates that a receiving status variable of the PDCP SN does not need to be kept, or the first indication information indicates that the PDCP SN of the multicast service or the target MBMS MRB of the multicast service before the reconfiguration is not synchronized with that after the reconfiguration, sorting, according to PDCP SNs, data of the multicast service received before the reconfiguration, submitting the data of the multicast service received before the reconfiguration to an upper layer according to ascending order of the PDCP SNs, resetting a PDCP reception status variable of the multicast service to an initial value, sorting, according to the PDCP SNs, data of the multicast service received after the reconfiguration, and submitting the data of the multicast service received after the reconfiguration to the upper layer according to ascending order of the PDCP SNs;

for the PDCP UM entity, when the second indication information indicates that the receiving status variable of the PDCP SN needs to be kept, or the first indication information indicates that the PDCP SN of the multicast service or the target MBMS MRB of the multicast service before the reconfiguration is synchronized with that after the reconfiguration, reserving the receiving status variable of the PDCP SN and data of the multicast service in a receiving cache, sorting, according to the PDCP SNs, the data of the multicast service received before and after the reconfiguration, and submitting the data received before and after the reconfiguration to the upper layer according to ascending order of the PDCP SNs; or for the PDCP UM entity, sorting the data of the multicast service received before the reconfiguration according to the PDCP SNs, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration to the upper layer according to ascending order of the PDCP SNs.

2. The multicast service receiving method according to claim 1, wherein the second indication information comprises at least one of the following:

indication information indicating whether the terminal needs to perform PDCP layer re-establishment;

indication information indicating whether the terminal needs to perform data recovery on a PDCP layer;

indication information indicating whether the terminal performs an Acknowledgment Mode (AM) or a Unacknowledgment Mode (UM) operation on the PDCP layer;

indication information indicating whether the terminal needs to perform PDCP layer reset, release, or new establishment;

indication information indicating whether the receiving status variable of the PDCP SN of the terminal needs to be kept; or indication information indicating whether the terminal needs to send a PDCP status report.

3. The multicast service receiving method according to claim 1, wherein the performing corresponding layer 2 processing according to the reconfiguration information comprises at least one of the following:

re-establishing a PDCP layer;

performing data recovery on the PDCP layer;

resetting, releasing, or newly establishing the PDCP layer;

performing an Acknowledgment Mode (AM) or Unacknowledgment Mode (UM) operation on the PDCP layer;

sorting the data of the multicast service received before and after the reconfiguration according to the PDCP SNs, and submitting the data of the multicast service received before and after the reconfiguration to the upper layer according to ascending order of the PDCP SNs;

sorting the data of the multicast service received before the reconfiguration according to the PDCP SNs, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration to the upper layer according to ascending order of the PDCP SNS;

sending a PDCP status report on a target Point-To-Point (PTP) path of the multicast service; or resetting, releasing, or newly establishing the RLC layer.

4. The multicast service receiving method according to claim 3, wherein performing the AM or the UM operation on the PDCP layer comprises:

performing the AM or the UM operation on the PDCP layer according to the indication information indicating that the terminal performs the AM or the UM operation on the PDCP layer in the reconfiguration information; or performing the AM or the UM operation on the PDCP layer according to the RLC layer configuration information in the reconfiguration information.

5. The multicast service receiving method according to claim 4, wherein performing the AM or the UM operation on the PDCP layer according to the RLC configuration information in the reconfiguration information comprises at least one of the following:

when the reconfiguration information indicates that only a PTP RLC entity or a Point To Multipoint (PTM) RLC entity is configured for the target MBMS MRB of the multicast service, and a mode of the configured RLC entity is RLC AM, performing the AM operation on the PDCP layer;

when the reconfiguration information indicates that only the PTP RLC entity or the PTM RLC entity is configured for the target MBMS MRB of the multicast service, and a mode of the configured RLC entity is RLC UM, performing the UM operation on the PDCP layer;

when the reconfiguration information indicates that the PTP RLC entity and the PTM RLC entity are both configured for the target MBMS MRB of the multicast service, and modes of the PTP RLC entity and the PTM RLC entity are both the RLC AM, performing the AM operation on the PDCP layer;

when the reconfiguration information indicates that the PTP RLC entity and the PTM RLC entity are both configured for the target MBMS MRB of the multicast service, and modes of the PTP RLC entity and the PTM RLC entity are both the RLC UM, performing the UM operation on the PDCP layer; or when the reconfiguration information indicates that the PTP RLC entity and the PTM RLC entity are both configured for the target MBMS MRB of the multicast service, and a mode of the PTP RLC entity is the RLC AM and a mode of the PTM RLC entity is the RLC UM, performing the AM or the UM operation on the PDCP layer.

6. The multicast service receiving method according to claim 3, wherein performing the corresponding layer 2 processing according to the reconfiguration information comprises at least one of the following:

for a PDCP AM entity, when the second indication information indicates that the receiving status variable of the PDCP SN does not need to be kept, or the first indication information indicates that the PDCP SN of the multicast service or the target MBMS MRB of the multicast service before the reconfiguration is not synchronized with that after the reconfiguration, sorting, according to the PDCP SNs, the data of the multicast service received before the reconfiguration, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration to the upper layer according to ascending order of the PDCP SNs;

for the PDCP AM entity, when the second indication information indicates that the receiving status variable of the PDCP SN needs to be kept, or the first indication information indicates that the PDCP SN of the multicast service or the target MBMS MRB of the multicast service before the reconfiguration is synchronized with that after the reconfiguration, reserving the receiving status variable of the PDCP SN and the data of the multicast service in the receiving cache, sorting, according to the PDCP SNs, the data of the multicast service received before and after the reconfiguration, and submitting the data of the multicast service received before and after the reconfiguration to the upper layer according to ascending order of the PDCP SNs; or for the PDCP AM entity, when the second indication information indicates that the terminal needs to send the PDCP status report, generating and sending the PDCP status report according to a current PDCP receiving status.

7. The multicast service receiving method according to claim 6, wherein sorting, according to the PDCP SNs, the data of the multicast service received before and after the reconfiguration, and submitting the data of the multicast service received before and after the reconfiguration to the upper layer according to ascending order of the PDCP SNs comprises:

using a first PDCP SN received after the reconfiguration plus 1 as an upper boundary variable of a PDCP receiving window, sorting the data of the multicast service received before and after the reconfiguration according to the PDCP SNs, and submitting the data of the multicast service received before and after the reconfiguration to the upper layer according to ascending order of the PDCP SNS.

8. The multicast service receiving method according to claim 3, wherein performing the corresponding layer 2 processing according to the reconfiguration information comprises:

when the second indication information indicates that the terminal needs to reset, release, or newly establish the RLC layer, performing at least one of the following:

resetting, releasing, or newly establishing the RLC layer; or for a RLC UM entity, setting a first received RLC SN plus 1 as an upper boundary of an RLC UM receiving window.

9. The multicast service receiving method according to claim 3, wherein when path switching occurs in the multicast service, performing the corresponding layer 2 processing according to the reconfiguration information comprises at least one of the following:

for the PDCP UM entity, receiving the data of the multicast service according to a switched path, performing PDCP SN duplication detection and re-sorting operations at the PDCP UM entity, and submitting the data of the multicast service to the upper layer according to ascending order of the PDCP SNS;

for a PDCP AM entity, when the switched path comprises a PTP RLC entity in an activated RLC AM mode, triggering the sending of the PDCP status report; or for the PDCP AM entity, when a path switching instruction is sent through layer 1 signaling or a Medium Access Control Control Element (MAC CE), after a physical layer or a Medium Access Control (MAC) layer receives and decodes the path switching instruction, informing the PDCP layer through an interlayer interface, and receiving, by the PDCP layer, data according to an activated receiving entity in the path switching instruction.

10. The multicast service receiving method according to claim 9, wherein triggering the sending of the PDCP status report comprises one of the following:

when the PDCP status report is triggered, generating and sending the PDCP status report according to a current PDCP receiving status; or when the PDCP status report is triggered, starting the Hybrid Automatic Repeat reQuest (HARQ) process timer, and after the HARQ process timer expires, generating and sending the PDCP status report according to the current PDCP receiving status.

11. The multicast service receiving method according to claim 1, further comprising:

when a Point-To-Point (PTP) RLC entity is configured in the reconfiguration information, and a mode of the PTP RLC entity is RLC Acknowledgment Mode (AM), defaulting that the PDCP SN of the multicast service or the target MBMS MRB of the multicast service before the reconfiguration is synchronized with that after the reconfiguration; or when there is a one-to-one mapping relationship between each Quality of Service (QoS) flow and each MRB of the multicast service before and after the reconfiguration, defaulting that the PDCP SN of the multicast service or the target MBMS MRB of the multicast service before the reconfiguration is synchronized with that after the reconfiguration.

12. A non-transitory computer-readable medium, storing a program or an instruction, wherein when the program or the instruction is executed by a processor, the multicast service receiving method according to claim 1 is implemented.

13. A multicast service configuration method, executed by a network side device, comprising:

sending reconfiguration information of a multicast service to a terminal, wherein the reconfiguration information comprises at least one of the following:

first indication information used to indicate whether a Packet Data Convergence Protocol (PDCP) Serial Number (SN) of a multicast service or a target Multicast Broadcast Multicast Service (MBMS) Radio Bearer (MRB) of the multicast service before reconfiguration is synchronized with that after the reconfiguration;

second indication information used to indicate a PDCP layer operation performed by the terminal;

third indication information used to indicate a Radio Link Control (RLC) layer operation performed by the terminal;

RLC layer configuration information; or

PDCP layer configuration information, wherein corresponding layer 2 processing is performed according to the reconfiguration information at least by:

for a PDCP Unacknowledgment Mode (UM) entity, when the second indication information indicates that a receiving status variable of the PDCP SN does not need to be kept, or the first indication information indicates that the PDCP SN of the multicast service or the target MBMS MRB of the multicast service before the reconfiguration is not synchronized with that after the reconfiguration, sorting, according to PDCP SNs, data of the multicast service received before the reconfiguration, submitting the data of the multicast service received before the reconfiguration to an upper layer according to ascending order of the PDCP SNs, resetting a PDCP reception status variable of the multicast service to an initial value, sorting, according to the PDCP SNs, data of the multicast service received after the reconfiguration, and submitting the data of the multicast service received after the reconfiguration to the upper layer according to ascending order of the PDCP SNs;

for the PDCP UM entity, when the second indication information indicates that the receiving status variable of the PDCP SN needs to be kept, or the first indication information indicates that the PDCP SN of the multicast service or the target MBMS MRB of the multicast service before the reconfiguration is synchronized with that after the reconfiguration, reserving the receiving status variable of the PDCP SN and data of the multicast service in a receiving cache, sorting, according to the PDCP SNs, the data of the multicast service received before and after the reconfiguration, and submitting the data received before and after the reconfiguration to the upper layer according to ascending order of the PDCP SNs; or for the PDCP UM entity, sorting the data of the multicast service received before the reconfiguration according to the PDCP SNs, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration to the upper layer according to ascending order of the PDCP SNs.

14. The multicast service configuration method according to claim 13, wherein the second indication information comprises at least one of the following:

indication information indicating whether the terminal needs to perform PDCP layer re-establishment;

indication information indicating whether the terminal needs to perform data recovery on a PDCP layer;

indication information indicating whether the terminal performs an Acknowledgment Mode (AM) or a Unacknowledgment Mode (UM) operation on the PDCP layer;

indication information indicating whether the terminal needs to perform PDCP layer reset, release, or new establishment;

indication information indicating whether the receiving status variable of the PDCP SN of the terminal needs to be kept; or indication information indicating whether the terminal needs to send a PDCP status report.

15. A non-transitory computer-readable medium, storing a program or an instruction, wherein when the program or the instruction is executed by a processor, the multicast service configuration method according to claim 13 is implemented.

16. A terminal, comprising:

a memory storing computer-readable instructions; and a processor coupled to the memory and configured to execute the computer-readable instructions, wherein the computer-readable instructions, when executed by the processor, cause the processor to perform operations comprising:

receiving reconfiguration information of a multicast service sent by a network side device, wherein the reconfiguration information comprises at least one of the following:

first indication information used to indicate whether a Packet Data Convergence Protocol (PDCP) Serial Number (SN) of the multicast service or a target Multicast Broadcast Multicast Service (MBMS) Radio Bearer (MRB) of the multicast service before reconfiguration is synchronized with that after the reconfiguration;

second indication information used to indicate a PDCP layer operation performed by the terminal; or third indication information used to indicate a Radio Link Control (RLC) layer operation performed by the terminal, RLC layer configuration information, and PDCP layer configuration information; and performing corresponding layer 2 processing according to the reconfiguration information, comprising:

for a PDCP Unacknowledgment Mode (UM) entity, when the second indication information indicates that a receiving status variable of the PDCP SN does not need to be kept, or the first indication information indicates that the PDCP SN of the multicast service or the target MBMS MRB of the multicast service before the reconfiguration is not synchronized with that after the reconfiguration, sorting, according to PDCP SNs, data of the multicast service received before the reconfiguration, submitting the data of the multicast service received before the reconfiguration to an upper layer according to ascending order of the PDCP SNs, resetting a PDCP reception status variable of the multicast service to an initial value, sorting, according to the PDCP SNs, data of the multicast service received after the reconfiguration, and submitting the data of the multicast service received after the reconfiguration to the upper layer according to ascending order of the PDCP SNs;

for the PDCP UM entity, when the second indication information indicates that the receiving status variable of the PDCP SN needs to be kept, or the first indication information indicates that the PDCP SN of the multicast service or the target MBMS MRB of the multicast service before the reconfiguration is synchronized with that after the reconfiguration, reserving the receiving status variable of the PDCP SN and data of the multicast service in a receiving cache, sorting, according to the PDCP SNs, the data of the multicast service received before and after the reconfiguration, and submitting the data received before and after the reconfiguration to the upper layer according to ascending order of the PDCP SNs; or for the PDCP UM entity, sorting the data of the multicast service received before the reconfiguration according to the PDCP SNs, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration to the upper layer according to ascending order of the PDCP SNs.

17. The terminal according to claim 16, wherein the second indication information comprises at least one of the following:

indication information indicating whether the terminal needs to perform PDCP layer re-establishment;

indication information indicating whether the terminal needs to perform data recovery on a PDCP layer;

indication information indicating whether the terminal performs an Acknowledgment Mode (AM) or a Unacknowledgment Mode (UM) operation on the PDCP layer;

indication information indicating whether the terminal needs to perform PDCP layer reset, release, or new establishment;

indication information indicating whether the receiving status variable of the PDCP SN of the terminal needs to be kept; or indication information indicating whether the terminal needs to send a PDCP status report.

18. The terminal according to claim 16, wherein the performing corresponding layer 2 processing according to the reconfiguration information comprises at least one of the following:

re-establishing a PDCP layer;

performing data recovery on the PDCP layer;

resetting, releasing, or newly establishing the PDCP layer;

performing an Acknowledgment Mode (AM) or Unacknowledgment Mode (UM) operation on the PDCP layer;

sorting the data of the multicast service received before and after the reconfiguration according to the PDCP SNs, and submitting the data of the multicast service received before and after the reconfiguration to the upper layer according to ascending order of the PDCP SNs;

sorting the data of the multicast service received before the reconfiguration according to the PDCP SNs, submitting the data of the multicast service received before the reconfiguration to the upper layer according to ascending order of the PDCP SNs, resetting the PDCP reception status variable of the multicast service to the initial value, sorting, according to the PDCP SNs, the data of the multicast service received after the reconfiguration, and submitting the data of the multicast service received after the reconfiguration, to the upper layer according to ascending order of the PDCP SNs;

sending a PDCP status report on a target Point-To-Point (PTP) path of the multicast service; or resetting, releasing, or newly establishing the RLC layer.

19. The terminal according to claim 18, wherein performing the AM or the UM operation on the PDCP layer comprises:

performing the AM or the UM operation on the PDCP layer according to the indication information indicating that the terminal performs the AM or the UM operation on the PDCP layer in the reconfiguration information; or performing the AM or the UM operation on the PDCP layer according to the RLC layer configuration information in the reconfiguration information.

20. The terminal according to claim 18, wherein performing the AM or the UM operation on the PDCP layer according to the RLC configuration information in the reconfiguration information comprises at least one of the following:

when the reconfiguration information indicates that only a PTP RLC entity or a Point To Multipoint (PTM) RLC entity is configured for the target MBMS MRB of the multicast service, and a mode of the configured RLC entity is RLC AM, performing the AM operation on the PDCP layer;

when the reconfiguration information indicates that only the PTP RLC entity or the PTM RLC entity is configured for the target MBMS MRB of the multicast service, and a mode of the configured RLC entity is RLC UM, performing the UM operation on the PDCP layer;

when the reconfiguration information indicates that the PTP RLC entity and the PTM RLC entity are both configured for the target MBMS MRB of the multicast service, and modes of the PTP RLC entity and the PTM RLC entity are both the RLC AM, performing the AM operation on the PDCP layer;

when the reconfiguration information indicates that the PTP RLC entity and the PTM RLC entity are both configured for the target MBMS MRB of the multicast service, and modes of the PTP RLC entity and the PTM RLC entity are both the RLC UM, performing the UM operation on the PDCP layer; or when the reconfiguration information indicates that the PTP RLC entity and the PTM RLC entity are both configured for the target MBMS MRB of the multicast service, and a mode of the PTP RLC entity is the RLC AM and a mode of the PTM RLC entity is the RLC UM, performing the AM or the UM operation on the PDCP layer.

* * * * *